(12) United States Patent
Aurousseau et al.

(10) Patent No.: US 8,857,150 B2
(45) Date of Patent: Oct. 14, 2014

(54) MONITORING OF A HIGH-PRESSURE PUMP IN A TURBINE ENGINE FUEL SUPPLY CIRCUIT

(75) Inventors: Christian Aurousseau, Rubelles (FR); Jonathan Benitah, Vincennes (FR); Xavier Flandrois, Cesson (FR); Jean-Remi Masse, Saint Cloud (FR); Mickael Sauzedde, Versailles (FR); Franck Godel, Chartrettes (FR); Julien Maille, Saint Cheron (FR)

(73) Assignee: SNECMA, Paris (FR)

( * ) Notice: Subject to any disclaimer, the term of this patent is extended or adjusted under 35 U.S.C. 154(b) by 1086 days.

(21) Appl. No.: 12/742,953

(22) PCT Filed: Nov. 18, 2008

(86) PCT No.: PCT/FR2008/001616
§ 371 (c)(1),
(2), (4) Date: May 14, 2010

(87) PCT Pub. No.: WO2009/101267
PCT Pub. Date: Aug. 20, 2009

(65) Prior Publication Data
US 2010/0257867 A1    Oct. 14, 2010

(30) Foreign Application Priority Data

Nov. 19, 2007 (FR) .................................... 07 08099

(51) Int. Cl.
| F02C 7/22 | (2006.01) |
|---|---|
| G01M 15/14 | (2006.01) |
| F02C 9/26 | (2006.01) |
| F02C 9/44 | (2006.01) |
| F02C 7/236 | (2006.01) |
| F02C 9/28 | (2006.01) |

(52) U.S. Cl.
CPC ........... *F02C 7/236* (2013.01); *F05D 2270/092* (2013.01); *F02C 9/263* (2013.01); *F05D 2260/80* (2013.01); *F02C 9/44* (2013.01); *F02C 9/28* (2013.01); *F05D 2270/304* (2013.01)
USPC .............. 60/39.091; 60/779; 60/803; 60/734; 73/112.01; 73/112.03

(58) Field of Classification Search
USPC ............ 60/779, 39.091, 803, 734; 73/112.01, 73/112.03
See application file for complete search history.

(56) References Cited

U.S. PATENT DOCUMENTS 3,774,394 A * 11/1973 Criffield ..................... 60/39.091
5,111,653 A   5/1992 Leeson
(Continued)

FOREIGN PATENT DOCUMENTS

| EP | 0 452 005 | 10/1991 |
|---|---|---|
| EP | 1 138 933 | 10/2001 |

(Continued)

*Primary Examiner* — Phutthiwat Wongwian
*Assistant Examiner* — Steven Sutherland
(74) *Attorney, Agent, or Firm* — Oblon, Spivak, McClelland, Maier & Neustadt, L.L.P.

(57) ABSTRACT

A device and method for monitoring a high-pressure pump in a turbomachine fuel supply circuit by detecting opening of a pressurizing and shut-off valve mounted on an outlet side of a fuel flow regulating valve, by measuring rotational speed of the turbomachine corresponding to the opening of the pressurizing and cut-off valve, and by monitoring change in a value of the rotational speed to propose replacement of the high-pressure pump when the measure value rotational speed reaches a predetermined threshold.

11 Claims, 1 Drawing Sheet

(56) References Cited

U.S. PATENT DOCUMENTS

| | | | |
|---|---|---|---|
| 5,709,079 A * | 1/1998 | Smith | 60/39.281 |
| 5,927,064 A * | 7/1999 | Dyer et al. | 60/790 |
| 6,205,766 B1 * | 3/2001 | Dixon et al. | 60/39.091 |
| 6,651,442 B2 * | 11/2003 | Davies et al. | 60/773 |
| 2001/0052338 A1 | 12/2001 | Yates | |
| 2005/0111988 A1 | 5/2005 | Griffiths | |
| 2007/0107435 A1 | 5/2007 | Bickley | |
| 2007/0261384 A1 | 11/2007 | Flint et al. | |

FOREIGN PATENT DOCUMENTS

| | | |
|---|---|---|
| EP | 1 522 731 | 4/2005 |
| EP | 1 522 344 | 7/2005 |
| EP | 1 785 348 | 5/2007 |
| EP | 1 798 400 | 6/2007 |

* cited by examiner

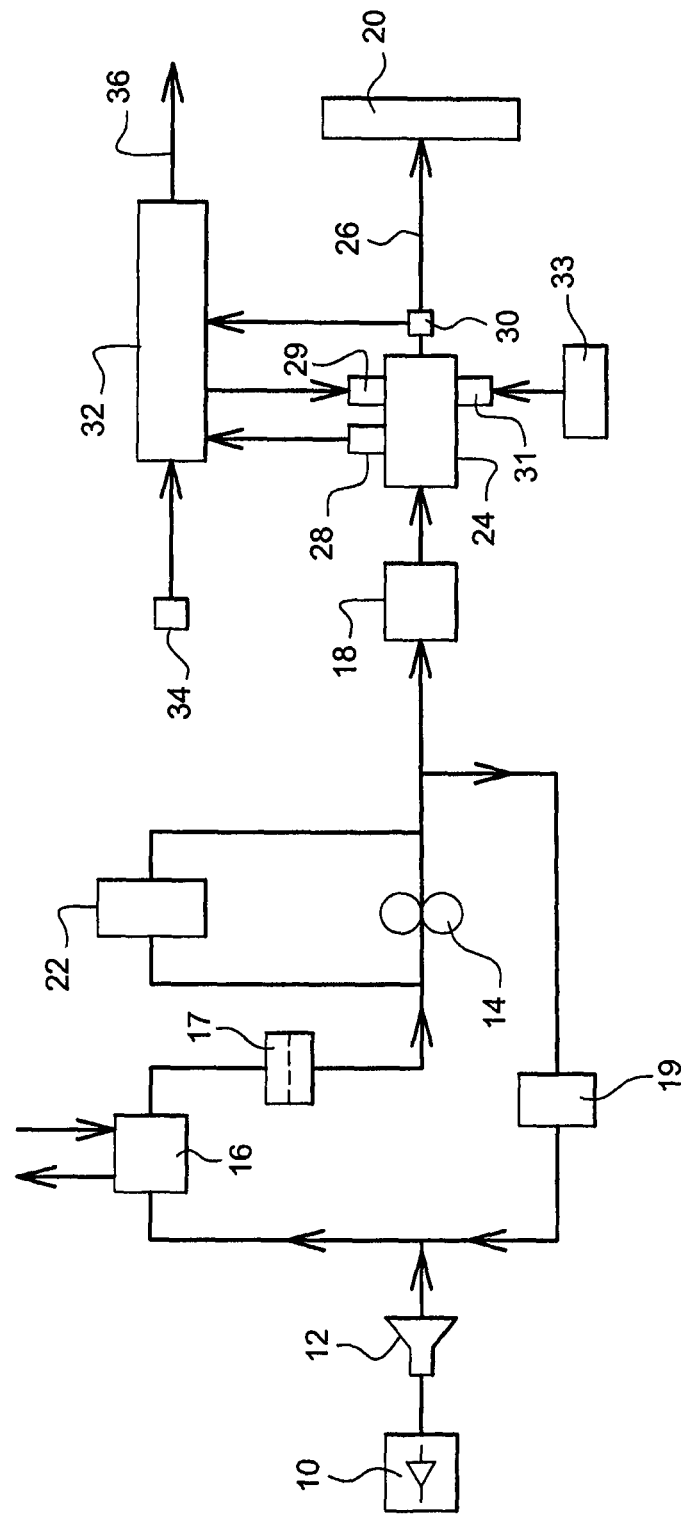

MONITORING OF A HIGH-PRESSURE PUMP IN A TURBINE ENGINE FUEL SUPPLY CIRCUIT

BACKGROUND OF THE INVENTION

1. Field of the Invention

The invention relates to a device and a method for monitoring a high-pressure pump in a fuel supply circuit of the injectors of a turbine engine such as a turbojet or a turboprop engine.

2. Description of the Related Art

In a turbine engine of this type, the supply circuit of the fuel injectors comprises a combination of a low-pressure pump and a high-pressure gear pump, with the low-pressure pump providing the feed of the high-pressure pump in order to avoid cavitation phenomena, with the high-pressure pump supplying a flow and a fuel pressure which are sufficient to provide the supply of the injectors of the combustion chamber of the turbine engine, as well as the cooling of the lubrication liquid of the turbine engine and of an IDG (Integrated Drive Generator) system and the controlling of actuators of elements with variable geometry of the turbine engine, (such as in particular guiding vanes with variable setting).

The fuel supplied by the high-pressure pump passes through an FMU (Fuel Metering Unit) which comprises a flow regulating valve connected to a pressurising and shut-off valve, which itself is connected to supply ducts of the injectors.

In the presence of an electric control for opening, the pressurising and shut-off valve remains closed hydraulically as long as the pressure of the fuel at the outlet of the regulating valve does not reach a predetermined value, for example 19 bars.

The high-pressure gear pump is driven mechanically by the turbine engine and its rotational speed is proportional to that of the turbine engine. The flow and the fuel pressure at the outlet of this pump are determined by the rotational speed of the pump. It has been observed that as the pump ages, it was necessary to increase the rotational speed of the pump in order to maintain the flow and pressure of the fuel at predetermined values.

This can make it difficult or impossible to restart the turbine engine in flight when, for any reason whatsoever, the turbine engine has been stopped and must be restarted through the sole effect of the air which flows on the compressor and turbine blades due to the displacement of the aircraft (an assistance for the starter also able to be adopted at certain points in the area of starting). The high-pressure pump is in this case driven in rotation at a relatively low speed but must however provide a pressure and a flow of fuel that are sufficient to cause the hydraulic opening of the pressurising and shut-off valve and in order to provide for proper supply of the injectors of the turbine engine.

The wear and tear of the high-pressure pump, which results in a progressive decrease of the flow of fuel at the pump outlet for a given rotational speed and a determined pressure, must be monitored so that the pump is replaced before a restarting in flight becomes impossible.

Maintenance recommendations call for a replacing of the high-pressure pump around 12,000 hours of operation and do not make it possible to optimise the life cycles of these pumps because, on the one hand, the premature wear and tear of the pumps cannot be detected and, on the other hand, pumps which are still in good operating condition sometimes need to be replaced.

BRIEF SUMMARY OF THE INVENTION

This invention has for purpose to provide a simple, effective and economical solution to this problem.

It proposes a device for monitoring a high-pressure pump in a fuel supply circuit of a turbine engine, this circuit comprising a pressurising and shut-off valve which is regulated at a predetermined pressure threshold and which is mounted between a fuel flow regulating valve and a supply duct of the injectors, and means for measuring the rotational speed of the turbine engine, characterised in that it comprises means for detecting the opening of the pressurising and shut-off valve, means for recording the measured value of the rotational speed of the turbine engine at the opening of the pressurising and shut-off valve, and means for comparing this value with a predetermined threshold, in order to propose the replacement of the high-pressure pump when the recorded value of the rotational speed reaches the predetermined threshold. These means are available in the FADEC (Full Authority Digital Engine Control) of the engine.

As the pressurising and shut-off valve of the fuel supply circuit is in general already provided with a means for detecting its opening, the device for monitoring according to the invention uses primarily components that are already installed on the turbine engine and is therefore particularly economical.

Moreover, it makes it possible to monitor with precision the change in the rotational speed at the time of the opening of the pressurising and shut-off valve, with this change being representative of the wear and tear of the high-pressure pump of the fuel supply circuit, in order to report the necessity of replacing the high-pressure pump when the rotational speed detected reaches a predetermined threshold, beyond which the restarting in flight of the turbine engine would become difficult or impossible.

Advantageously, the opening of the pressurising and shut-off valve is detected and the value of the corresponding rotational speed is recorded during each of the starting phases of the turbine engine.

According to another characteristic of the invention, this device further comprises means for measuring the temperature of the fuel and means for correcting the recorded value of the rotational speed according to the difference between the measured temperature and a predetermined temperature.

This makes it possible to take into account the fuel density variations, which result from the temperature variations of the fuel, in order to correct the recorded values of the rotational speed and as such make the comparisons with the predetermined threshold in conditions corresponding to a substantially constant temperature.

The invention further proposes a method for monitoring a high-pressure pump in a turbine engine fuel supply circuit, this circuit comprising a pressurising and shut-off valve mounted between a fuel metering valve and a supply duct of the injectors, characterised in that it consists in detecting the opening of the pressurising and shut-off valve, in recording the value of the rotational speed of the turbine engine corresponding to this opening, in comparing this value with a predetermined threshold and in proposing the replacement of the high-pressure pump when the recorded value of the rotational speed reaches the predetermined threshold.

According to other characteristics of the invention, this method further consists in measuring the temperature of the fuel at the outlet of the pressurising and shut-off valve and in correcting the recorded value of the rotational speed according to the difference between the measured temperature and a predetermined temperature value, and in determining the comparison threshold of the recorded value of the rotational speed in such a way as to provide for the restarting in flight of the turbine engine throughout the entire service life of the high-pressure pump.

The invention further proposes a turbine engine, such as a turbojet or a turboprop engine, characterised in that it comprises a device for monitoring the high-pressure pump in a fuel supply circuit, of the type defined hereinabove.

Generally, the invention makes it possible to optimise the operation of the high-pressure pumps in turbine engine fuel supply circuits, and also makes it possible to render reliable the automatic overspeed test of the turbine engines.

BRIEF DESCRIPTION OF THE DRAWINGS

The invention will be better understood and other characteristics, details and advantages of the latter shall appear more clearly when reading the following description, provided by way of example in reference to the annexed drawing, which diagrammatically shows a fuel supply circuit of the injectors of a turbine engine.

DETAILED DESCRIPTION OF THE INVENTION

The fuel supply circuit shown diagrammatically in the drawing substantially comprises a fuel tank 10 to which is connected the inlet of a low-pressure pump 12 of which the outlet supplies a high-pressure gear pump 14 by the intermediary of heat exchangers 16 and filters 17, the heat exchangers serving in particular for the cooling of the lubrication liquid of the turbine engine and for an IDG (Integrated Drive Generator) system.

The outlet of the high-pressure pump 14 supplies a flow regulating valve 18 (FMV or Fuel Metering Valve) which makes it possible to dose the quantity of fuel sent to the injectors 20 of the turbine engine according to the operating conditions.

The difference in pressure between the inlet and the outlet of the pump 14 is also used to control a set 22 of auxiliary equipment with variable geometry, comprising in particular actuators of guiding vanes with variable setting.

The excess fuel pumped is returned upstream of the high-pressure pump 14 by the intermediary of a by-pass valve 19.

A pressurising and shut-off valve 24 is mounted between the outlet of the flow regulating valve 18 and a supply duct 26 of the injectors 20, with this valve 24 being sensitive to the pressure of the fuel at the outlet of the valve 18 and prohibiting the supply of the fuel of the injectors 20 as long as this pressure does not reach a certain value, i.e. as long as the pressurising of the fuel is less than a determined threshold, this pressurising corresponding to the difference in pressure between the outlet and the inlet of the pump 14 and being for example 19 bars.

The pressurising and shut-off valve 24 is provided with a detector of opening 28 and with two electro-hydraulic control members 29 and 31, of the servovalve or solenoid type, of which one is excited by the means for processing 32 and the other by an overspeed system 33. These control members 29 and 31 are effective only if the pressure is sufficient.

A temperature sensor 30 is mounted on the line 26 supplying the injectors 20.

The signals provided by the detectors 28 and 30 are applied to means for processing 32, which also receive the outlet signal of a detector 34 measuring the rotational speed of the turbine engine.

In the means for processing 32, the signal of opening of the pressurising and shut-off valve 24, which is supplied by the detector 28, controls the recording of the value of the rotational speed supplied by the detector 34, and of the value of the temperature of the fuel, supplied by the detector 30. The recorded values of the rotational speed are compared to a predetermined threshold value, beyond which it would be difficult to restart the turbine engine in flight and which corresponds to maximum admissible wear and tear of the high-pressure pump 14. When this threshold value is reached by the rotational speed, a signal 36 is generated by the means for processing 32 in order to report the necessity of replacing the high-pressure pump 14.

Measuring the temperature of the fuel in the line 26 makes it possible to take into account the variations in the density of the fuel which result from the temperature variations and which have an influence on the flow of the high-pressure pump 14. The variations detected in the temperature of the fuel make it possible to correct the measured values of the rotational speed and therefore to return in the case of a fuel supply to a substantially constant temperature.

The opening of the pressurising and shut-off valve occurs during each starting phase of the turbine engine. Monitoring of the high-pressure pump 14 can therefore be carried out at each starting of the turbine engine and makes it possible to regularly follow the wear and tear of the high-pressure pump 14, in order to propose its replacement when this becomes necessary.

The invention further makes it possible to render reliable the overspeed test of the turbine engine by associating this test in an original and automatic manner to the starting and monitoring phase of the high-pressure pump.

An example of test logic is described hereinafter, with many alternatives able to be derived.

When the engine is started, to a few speed percents, an electric order is generated by the means for processing 32 on the electro-hydraulic control 29 of the pressurising and shut-off valve 24. The hydraulic circuit does not open because the speed is below the opening threshold of the pressurising and shut-off valve 24.

The speed increases due to the fact of the action of the starter and when the opening threshold (acquired by the detector 28) is reached, the means for processing 32 record the value of the rotational speed which makes it possible to issue a judgement on the condition of the high-pressure pump 14.

The means for processing 32 thus provide a signal to the overspeed system 33 which triggers its test, i.e. the control of the closing of the pressurising and shut-off valve 24 by the intermediary of the electro-hydraulic control 31.

The means for processing 32 check by the intermediary of the detector of opening 28 that the overspeed system 33 has been effective and issues an end of test order to the overspeed system 33 so that the latter controls the closing of its electro-hydraulic member 31. Simultaneously, the means 32 issue a closing order to the electro-hydraulic control 29. The pressurising and shut-off valve 24 closes.

The rotation of the engine driven by the starter continues and, at the optimal starting speed, the means for processing 32 issue an opening order to the pressurising and shut-off valve 24 by the intermediary of the electro-hydraulic control 29 and send a command to the ignition exciter box which will energise the sparking plug(s) of the engine.

The invention claimed is:

1. A device for monitoring a high-pressure pump in a turbine engine fuel supply circuit, the circuit including a pressurizing and shut-off valve that is mounted at a flow outlet of a fuel metering valve and at a flow inlet of a supply duct of the injectors, and means for measuring rotational speed of the turbine engine, the device comprising:

means for detecting an opening of the pressurizing and shut-off valve;

means for recording a measured value of the rotational speed of the turbine engine at opening of the pressurizing and shut-off valve; and means for comparing the measured value with a predetermined threshold, to propose replacement of the high-pressure pump when the recorded value of the rotational speed reaches the predetermined threshold, wherein the pressurizing and shut-off valve remains in a closed position and prohibits the supply of the fuel to the injectors as long as a pressure of the fuel at the outlet of the fuel metering valve is less than a predetermined pressure threshold, and is in an opened position otherwise.

2. A device according to claim 1, wherein the comparison threshold is determined so that a restarting in flight of the turbine engine is provided throughout an entire service life of the high-pressure pump.

3. A device according to claim 1, further comprising:

means for measuring a temperature of fuel at an outlet of the pressurizing and shut-off valve; and means for correcting the recorded value of the rotational speed according to a difference between the measured temperature and a predetermined temperature.

4. A turbine engine, or a turbojet or a turboprop engine, comprising the device for monitoring the high-pressure pump according to claim 1.

5. A device according to claim 1, further comprising an overspeed system which closes the pressurizing and shut-off valve using an elctro-hydraulic control member during starting phase of the turbine engine and after detection of the opening of the pressurizing and shut-off valve.

6. A device according to claim 1, wherein the predetermined pressure threshold is 19 bars.

7. A method for monitoring a high-pressure pump in a turbine engine fuel supply circuit, comprising:

detecting opening of a pressurizing and shut-off valve;

recording a value of rotational speed of the turbine engine corresponding to the detected opening;

comparing the value with a predetermined threshold; and proposing replacement of the high-pressure pump when the recorded value of the rotational speed reaches the predetermined threshold, wherein the pressurizing and shut-off valve is mounted in the circuit at a flow outlet of a fuel metering valve and at a flow inlet of a supply duct of injectors, the pressurizing and shut-off valve remaining in a closed position and prohibiting the supply of the fuel to the injectors as long as a pressure of the fuel at the outlet of the fuel metering valve is less than a predetermined pressure threshold, and being in an opened position otherwise.

8. A method according to claim 7, further comprising:

detecting the opening of the pressurizing and shut-off valve; and recording the value of the corresponding rotational speed during each of starting phases of the turbine engine.

9. A method according to claim 8, further comprising:

carrying out a test of an overspeed system during starting phase of the turbine engine and after detection of the opening of the pressurizing and shut-off valve.

10. A method according to claim 7, further comprising:

measuring a temperature of fuel at an outlet of the pressurizing and shut-off valve; and correcting the recorded value of the rotational speed according to a difference between the measured temperature of the fuel and a predetermined temperature value.

11. A method according to claim 7, further comprising:

determining a comparison threshold of the recorded value of the rotational speed in such a way as to provide for restarting in flight of the turbine engine throughout an entire service life of the high-pressure pump.

\* \* \* \* \*

UNITED STATES PATENT AND TRADEMARK OFFICE
CERTIFICATE OF CORRECTION

PATENT NO.        : 8,857,150 B2                          Page 1 of 1
APPLICATION NO.   : 12/742953
DATED             : October 14, 2014
INVENTOR(S)       : Christian Aurousseau et al.

It is certified that error appears in the above-identified patent and that said Letters Patent is hereby corrected as shown below:

In the Specification

Column 5, line 33, change "elctro-hydraulic control" to --electro-hydraulic control--.

Signed and Sealed this
Nineteenth Day of May, 2015

Michelle K. Lee
*Director of the United States Patent and Trademark Office*